Dec. 1, 1959 J. H. BARNES 2,915,335
TIRE TRIM MEMBER AND SECURING MEANS THEREFOR
Filed May 22, 1956 2 Sheets-Sheet 1

INVENTOR.
JAMES H. BARNES
BY Oldham & Oldham
ATTYS.

Dec. 1, 1959  J. H. BARNES  2,915,335
TIRE TRIM MEMBER AND SECURING MEANS THEREFOR
Filed May 22, 1956  2 Sheets-Sheet 2
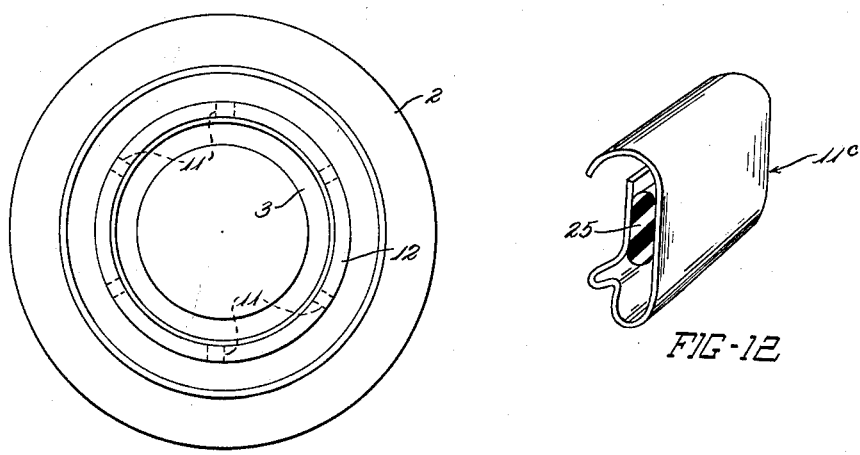
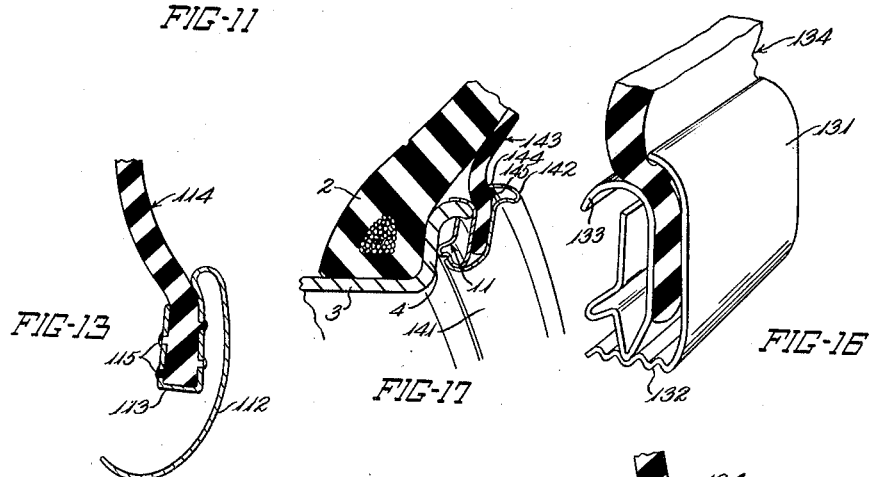
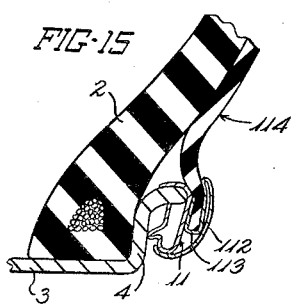
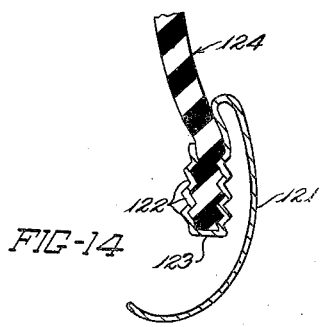
INVENTOR.
JAMES H. BARNES
BY Oldham & Oldham
ATTYS.

United States Patent Office 2,915,335
Patented Dec. 1, 1959

2,915,335

TIRE TRIM MEMBER AND SECURING MEANS THEREFOR

James H. Barnes, Wadsworth, Ohio

Application May 22, 1956, Serial No. 586,558

7 Claims. (Cl. 301—37)

This invention relates to tire trim members, and particularly relates to a tire trim member for use in a tire and wheel assembly having special clip and ring means for securing the trim member in position.

Heretofore there have been various substitutes proposed for white sidewall tires in order to provide trim and decorative means for use on a tire assembly without incurring the expenses of and disadvantages of white sidewall tires. Some of such prior constructions are shown, for example, in my own prior Patents Nos. 2,737,422; 2,621,979 and 2,696,409. Other structures are shown in U.S. Patents Nos. 2,573,996 and 2,691,550. French Patent No. 1,061,278 shows yet another approach to the problem of providing attractive trim and decorative members for attachment to sidewalls of tire assemblies.

These trim members have all been made from rubber or similar plastic material and with the trim and decorative member being provided in an attractive color, such as white, although other colors may be used in making up the trim members. While some structures, particularly such as those shown in my Patent No. 2,737,422, have been very successful commercially and have been made and sold in large quantities, some people object to such types of trim members. Assembly of these trim members on a pneumatic tire requires deflation of the tire, a careful centering of the trim member in the tire assembly and careful reinflation of the tire. Usually there has been an additional charge for placing the trim member on a tire assembly. The trim member is held in position by means of a radially inner skirt portion adapted to be clamped or fixed between the tire rim flange and the bead of a tire position on such rim. The remainder of the decorative member extends up radially inwardly of the tire and resiliently hugs such tire sidewall.

The general object of the present invention is to provide a novel and attractive trim member of the general class referred to characterized by the use of clips and and anchor ring on the outside of the tire so that the trim member can be positioned on the tire without deflation thereof.

Another object of the invtention is to secure a trim member to a tire and wheel assembly wherein the trim member is positioned by means of metal clips that can be pounded or otherwise secured to the rim flange of a tire and rim assembly without injury thereto or change thereof.

Still another object of the invention is to provide a trim member for a tire and wheel assembly, the member having an associated anchor ring carrying a plurality of circumferentially spaced clips for securing the member to the assembly.

Other objects of this invention are to provide metal clip means for engaging the rim flange of the tire and wheel assembly to support a trim member on such clip means, to provide clip means that will not collapse when pounded into engagement with a tire assembly, and to provide a special anchor ring and trim member combination unit.

The foregoing and other objects and advantages of the invention will be made more apparent as the specification proceeds.

In order to disclose the present invention fully, currently preferred embodiments thereof are shown in the enclosed drawings, wherein:

Fig. 11 is an elevation of an assembly of the entire wheel, trim member, anchor means of Fig. 4, but indicating how many of the trim members of the invention would be positioned;

Fig. 12 is a perspective view of another style of a retainer clip;

Figs. 13 and 14 are enlarged sections through modified anchor rings of the invention that have trim members bonded thereto;

Fig. 15 is a fragmentary section showing the anchor ring of Fig. 13 in a tire and rim assembly;

Fig. 16 is a perspective view of another anchor ring shown in sectional engagement with a retainer clip; and Fig. 17 is a section of yet another style of an anchor ring shown operatively positioned in a wheeel assembly.

When referring to corresponding members shown in the drawings and referred to in the specification, corresponding numerals are used to facilitate comparison therebetween.

Figure 1:
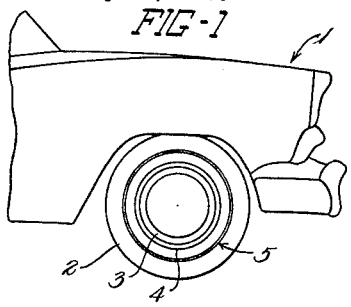
Fig. 1 is an elevation of the resilient rubber trim and decorative member of the invention showing it operatively positioned.

The present invention in general relates to the combination of a pneumatic tire and rim including a rim flange, a plurality of metal clips having a spaced pair of walls engaging the rim flange to secure the clips to the rim flange and extend inwardly therefrom on the outer edge thereof at spaced portions around the periphery thereof, a flexible trim member having a radially inner section, and an anchor ring engaging the radially inner ends of the plurality of clips and operatively engaging the tire rim, the trim member being positioned against the pneumatic tire by the anchor ring securing an inner section of the trim member against the rim flange and to the clips.

Reference now is made to the details of the structure shown in the drawings, and an automobile vehicle is indicated by the numeral 1. This vehicle 1 has a tire and rim assembly thereon comprising a pneumatic tire 2 which is carried on a metal wheel and rim 3 having an edge flange 4 thereon. A resilient rubber trim and protective member 5 is positioned on this tire and rim assembly by means of a radially inner sharply curved skirt portion 6 on the trim member being compressed or engaged between the rim flange 4 and a bead portion of the tire 2 positioned thereon. The trim and protective member 5 is of such an original shape that when the skirt portion is positioned as in Fig. 2, then a radially outer, flatly curved decorative portion 7 thereof is maintained in resilient hugging or snug engagement with the sidewall portion of the pneumatic tire 2.

Figure 3:
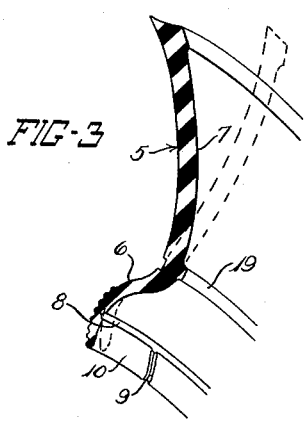
Fig. 3 is a partial perspective broken away to show a section of the trim member of Fig. 1 as initially molded and with its operative position being indicated.

Fig. 3 of the drawing best shows a sectional view of this trim and protective member 5 which is quite similar to the structure disclosed in and covered by my Patent No. 2,737,422. However, this trim and protective member 5 has a special feature therein in that an annular scoring 8 is provided in the skirt portion 6 spaced slightly from the radially inner edge thereof. Also, a transverse score 9 is provided in the skirt portion and extends from the radially inner edge thereof to the scoring 8 to provide a tearing or starting score so that a tear strip 10 defined by the score 8 can be readily removed from engagement with the trim member 5, if desired, for the purposes hereinafter explained in more detail.

Figure 4:
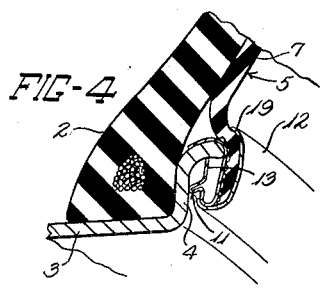
Fig. 4 is a fragmentary vertical section through the trim member of Fig. 3 showing it operatively positioned on a tire and wheel assembly by clip and anchor ring means of the invention.

Fig. 4 is a good view of a novel assembly of the invention wherein a plurality of metal clips 11 are used for securing an annular metal anchor ring 12 to the rim flange 3. A plurality of these clips 11 are secured to substantially equally spaced circumferential portions of the rim edge flange 4. These clips 11 may be considered to be substantially C-shaped in section for when looking at the opposite end of these clips from that view shown in Figs. 4 and 5, these clips would have such general contour. The clips comprise inner retainer walls 13 that preferably have serrated or jagged upper edges 14 thereon to facilitate the clips bonding and being anchored securely to the rim edge flange when engaged therewith, as hereinafter described.

Figure 5:
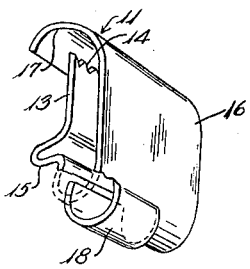
Figs. 5 through 7 are perspective views of different styles of clip means such as can be used in anchoring a trim member to a tire and wheel assembly.

Fig. 5 of the drawings also shows that preferably these clips 11 have substantially U-shaped sections 15 provided therein wherein the walls of the U-shaped sections are spaced from each other and some resiliency is provided in the wall thereby. Such sections 15 may be inclined downwardly slightly to facilitate the desired bending or flexing action therein, and they are outwardly directed with relation to the clips 11 as a whole. Integral outer walls 16 are formed in the clips 11 and they terminate in overhanging end sections 17. The end sections 17 are spaced from the upper edges 14 of the inner walls 13 so that the clips 11 can be forced, pushed or pounded into engagement with the rim edge flange 4, as shown in Fig. 4, and be tightly bonded or secured thereto even though the rim carries an inflated tire. Hence the clips 11 are carried by the rim flange 3 and are of such a construction as to be tightly held against the laterally outer surfaces thereof. Preferably the clips 11 are provided with resilient locking lugs or fingers 18 struck from bottom portions thereof. These resilient locking fingers 18 protrude slightly from the remainder of the clips and form means that can be relatively easily depressed to push the anchor ring 12 over a plurality of the clips when engaging the anchor ring to the tire and wheel assembly.

The anchor ring 12 is generally of C-shape in section and the inner diameter thereof is such as to permit such anchor ring 12 to be sprung over the radially inner ends of the clips 11 when a plurality of them are substantially equally spaced around the periphery of the tire rim 3 and be anchored thereto by such clips. The anchor ring 12 preferably is made from suitable sheet metal rolled to a desired contour as shown and having slight resiliency therein due to the contour thereof. The outer edge of such anchor ring 12 preferably engages with a strengthening rib 19 provided on the trim and protective member 5 adjacent a flexure zone therein provided intermediate the skirt portion and decorative portion thereof.

Figure 2:
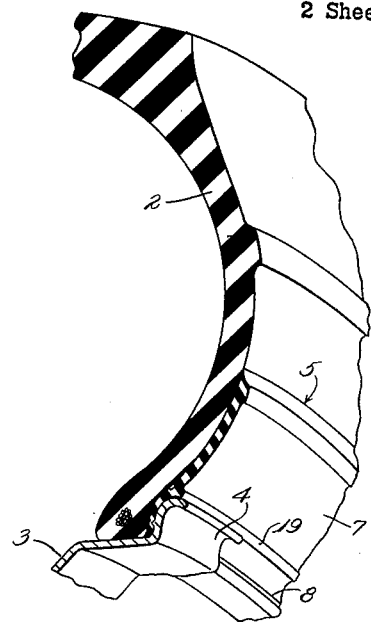
Fig. 2 is an enlarged perspective view, partly in section, of the trim member of Fig. 1, showing it engaged with a tire and rim in one type of assembly.

Before assembling the trim member 5 by the anchor ring 12, the tear strip 10 should be torn or cut therefrom as the skirt portion 6 usually should be shorter when so positioned than when mounted as in Fig. 2.

Figure 6:
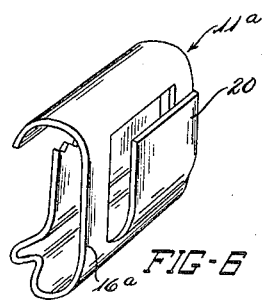

Fig. 6 shows a modified type of a metal clip for use in the assembly of the invention, only in this instance, a clip 11a is shown and it has an outwardly struck retainer flange, finger or lug 20 provided thereon. Such lug is formed by pressing, cutting or stamping or otherwise forcing a portion from the outer wall 16a thereof. The lug 20 is adapted to engage the radially inner edge of the skirt portion 6 of any trim member associated with such clip 11a prior to engaging the metal anchor ring 12 therewith and this facilitates the initial assembly of the trim member to the tire assembly.

Figure 7:
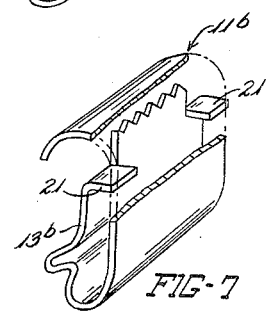

Fig. 7 shows another modified type of an anchor clip 11b and a feature of such clip 11b is that portions of the inner retainer wall 13b thereof have lugs or flanges 21 pressed or struck therefrom. These flanges 21 are adapted to abut against the outer wall of the clip 11b and prevent the inner and outer walls thereof from being collapsed and aid in retaining desired resiliency in the clip 11b.

Figures 8, 10:
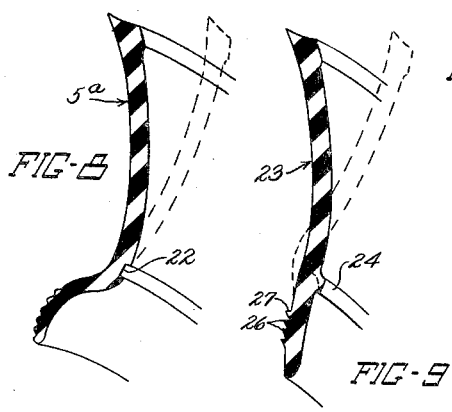
Figs. 8 and 9 are sectional views, like Fig. 3, of modified types of trim members of the invention.
Fig. 10 is a section through an assembly of the trim member of Fig. 9.

Fig. 8 of the drawings shows a modified type of a trim and protective member 5a for use in practice of the invention. In this instance, a recess 22 is provided on the outer surface of the trim and protective member 5a intermediate the skirt and decorative portions thereof. Thus, when such trim and protective member is positioned by an anchor ring, the outer edge of the anchor ring can seat in the recess 22 provided therein to aid in securing the trim member in position.

Figure 9:
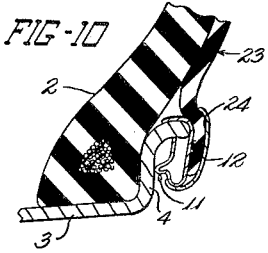

A novel style and shape of a trim member 23 is shown in cross section in Fig. 9. In this trim member, the skirt portion is substantially coextensive with and of about the same general flatly curved shape as the decorative portion of the trim member. This is a special trim member provided only for use with clip and anchor ring retaining means of the invention as disclosed herein and could not readily be assembled in the position shown for the trim and protective member 5 in Fig. 2.

Fig. 10 illustrates the assembly of such trim member 23 in a tire and wheel assembly and wherein an anchor ring 12, as previously described, would engage a reenforcing rib 24 on the trim member 23 for securing the member in place.

A further modification of a metal clip 11c is shown in Fig. 12. In this instance, a resilient pad or block 25 is suitably secured intermediate the inner and outer walls of the clip 11c to prevent any collapse thereof. This resilient block 25 may be made from rubber or other resilient plastic material and may be mechanically or chemically bonded to the clip 11c, as desired.

It is a further important feature of the invention that a trim member could be mechanically bonded and/or be vulcanized directly to an anchor ring in the assembly to facilitate securing a trim member in desired position. Thus Fig. 13 of the drawings shows a novel anchor ring 112 which has a substantially U-shaped edge flange 113 on its inner surface. In this instance, a trim and protective member 114 has a radially inner portion received in and completely filling such U-shaped edge flange 113 and preferably with at least small buttons 115 of material being formed integrally with the trim member 114 and extending through suitable apertures provided in the walls of the edge flange 113. This aids in mechanically bonding the trim member 114 in position, although of course, the trim member can be vulcanized in place, if desired. This anchor ring 112 is secured in position by exactly the same style of clips as disclosed hereinbefore.

Fig. 14 shows yet a further modified type of an anchor ring 121 wherein a plurality of corrugations 122 are provided on a U-shaped inner flange 123 formed integrally with the anchor ring. In this instance, the mechanical bonding of a trim member 124 by being integrally molded in the flange 123 may serve to bond it mechanically in place. However, other anchoring means such as cementing, or vulcanization can be used, as described.

Fig. 16 shows yet a further style of an anchor ring 131 wherein a serrated, or corrugated bottom edge 132 is provided on the ring. Thus a metal clip 133 is provided with a substantially V-shaped lower edge for engaging these serrations 132 so that the ring 131 can be engaged with a plurality of clips 133 by having the radially inner edge of the ring forced over the radially inner edge of the clips 133 and effect a good mechanical bond therewith for positioning a trim member 134 as shown.

Fig. 17 shows how the same style of clips 11 can secure a modified anchor ring 141 to a rim. The anchor ring 141 has a bead or edge flange 142 thereon that simulates a rim flange to make the sidewall assembly more realistic. A trim member 143 can be vulcanized to the ring 141 or it may be clamped in position thereby, or bonded thereto, as desired. Note that the anchor ring 141 terminates in an inwardly directed edge flange 144 which engages a rib 145 on the trim member 143 to hold it in place. The trim member 143 could be cemented, vulcanized or otherwise bonded to the anchor ring 141, if desired.

Ribs or serrations 26 extending around the inner surface of the trim member 23 are shown in Fig. 9. These ribs are upwardly directed and terminate in shoulders 27 and are believed to help retain the trim member in operative position. Similar ribs may be used on the trim member 5, if desired.

Of course, the assembly of the invention may be used with tubed or tubeless tires as desired.

The clips used for securing the anchor rings in position are made from conventional metal of suitable gage and composition to enable them to be forced into engagement with a rim flange. Variations in thickness in such flanges are compensated for by compression of the U-shaped sections 15. It will be appreciated that the flanges 21 of the clips 11b can be used on the clips 11, if desired, and that the clips 11 may have the locking lugs 18 omitted therefrom.

The anchor ring 12, or equivalents in the assemblies of the invention, can usually be sprung over the retainer clips holding them in position by prying the anchor rings free. Such prying action may free the retainer clips from the rim flange to remove the trim member from the wheel assembly. The anchor ring, for example in Figs. 4, 10, 16 and 17, will compress the asociated trim member against its mounting clips and against the rim flange to secure the trim member in position. At least some compressive force is exerted by the anchor rings, in all cases, against the trim members.

A reenforcing or lock rib 19 is provided on the trim member 5 and other trim members as desired. Thus the top flange or portion of the anchor ring can interlock with such rib 19, or recess 22, Fig. 8, to aid in securing the trim members in their operative positions.

It will be realized that the trim and protective members used in practice of the invention may be made from any desirable plastic material and usually some type of natural, or synthetic rubber, or rubber-like material is used. These trim members may be formed in any desired color and initially are molded in such a cross sectional contour that the decorative portion of the trim member must be urged axially outwardly an appreciable distance to set up forces therein aiding in resiliently retaining such protective and decorative portion of the trim member in operative engagement with a tire sidewall, all as disclosed in more detail in my previous patent referred to hereinabove.

The word "rim" is used in the specification and claims to cover any structure whether such rim is integral with a wheel construction, or to cover the rim if made separately from a support wheel.

While several complete embodiments of the invention have been disclosed herein, it will be appreciated that modification of these particular embodiments of the invention may be resorted to without departing from the scope of the invention as defined in the appended claims.

I claim:

1. In combination, a pneumatic tire and rim including a rim flange, a plurality of separate generally C-shaped metal clips substantially immovably secured to said rim flange and extending radially inwardly over the outer edge thereof, a flexible trim member having a radially inner section, and an anchor ring having its radially inner edge engaging the radially inner ends of said clips to be positioned thereby, said trim member being secured against said pneumatic tire by said anchor ring pressing said inner section of said trim member against said rim flange and said clips.

2. In combination, a pneumatic tire and rim including a rim flange, a plurality of generally C-shaped metal clips substantially immovably secured to said rim flange and extending radially inwardly over the outer edge thereof, a flexible trim member having a radially inner section with a lock rib thereon, and a substantially C-shaped in section anchor ring engaging the radially inner ends of said clips to extend radially outwardly therefrom and operatively engaging said rim flange and said lock rib of said trim member to prevent radially outward movement thereof, said trim member being secured against said pneumatic tire by said anchor ring securing said inner section of the trim member against said rim flange and to said clips.

3. Apparatus for securing a resilient trim member to a pneumatic tire and rim assembly and comprising a plurality of generally C-shaped metal clips with inner retainer walls thereon, the radially outer ends of said clips being adapted to engage a tire rim flange adjacent the edge thereof and with said retainer walls also engaging the rim flange to aid in securing the clips thereto, a ring adapted to be secured to a pneumatic tire rim by engaging said clips, a plurality of said clips being adapted to engage said rim around the periphery thereof, and a resilient trim member having a radially inner section bonded to said ring to extend radially outwardly from and be supported on said ring.

4. Apparatus for securing a resilient trim member to a pneumatic tire and rim assembly and comprising a plurality of metal clips with spaced walls thereon and having radially outer ends adapted to engage an edge surface of a tire rim flange, an annular unit adapted to be secured to a pneumatic tire rim by engaging a plurality of said clips, said annular unit including a generally C-shaped in section annular anchor ring having an inwardly directed flange on its radially outer edge, and a resilient trim member having a reinforcing rib thereon at a radially inner portion thereof, said trim member being adapted to be positioned on the rim assembly and secured thereto by said anchor ring to extend generally radially outwardly from said anchor ring, said flange of said anchor ring being adapted to engage a radially outer edge of said reinforcing rib to aid in securing said trim member to a tire and rim assembly.

5. In combination, a pneumatic tire and rim including a rim flange, a plurality of metal clips having an overhanging flange engaging a rim flange to secure them immovably to said rim flange to extend radially inwardly thereform on the axially outer edge thereof and terminate radially outwardly from the radially inner edge of said rim flange, a flexible trim member having a radially inner section, and an anchor ring engaging the radially inner ends of said clips to extend radially outwardly therefrom and be urged thereby axially inwardly towards the lateral margins of said rim flange, said anchor ring terminating adjacent but radially outwardly of said rim flange, an outer portion of said member being resiliently positioned against said pneumatic tire by said anchor ring which secures said inner section of said trim member against the axially outer edge of said rim flange and said clips.

6. A combination as in claim 5 wherein said trim member is bonded to said anchor ring.

7. Trim member apparatus for engaging a tire, rim and wheel assembly and comprising a plurality of clips having axially spaced inner and outer walls and with said outer walls having overhanging flanges thereon for engaging the lateral edge of a flange on the rim, said clips having a radially inner section integrally connecting said inner and outer walls, said clips being adapted to contact the side of the rim flange and to be of the approximate radial length thereof, a resilient trim member of annular form adapted to have its radially outer portion lie against a tire sidewall and with its radially inner portion being adapted to lie against the outer edge of the rim flange and the outer wall of any of said clips engaged therewith, the radially inner edge of said trim member terminating radially outwardly of the radially inner ends of said clips when operatively positioned, and an anchor ring of elongated C-shape in section including an arcuate edge flange on the radially inner end thereof that terminates in a radially outwardly directed edge of a larger diameter than the diameter of a circle defined by the radially inner ends of said clips when operatively positioned, said anchor ring being adapted to engage said clips and to extend radially outwardly therefrom to hold the radially inner portion of said trim member against said clips and rim flange when engaging said clips.

References Cited in the file of this patent

UNITED STATES PATENTS

| | | |
|---|---|---|
| 1,968,076 | Goodyear et al. | July 31, 1934 |
| 2,148,847 | Wiley | Feb. 28, 1939 |
| 2,218,410 | Weaver | Oct. 15, 1940 |
| 2,329,854 | Rubsam | Sept. 21, 1943 |
| 2,394,958 | Wood | Feb. 12, 1946 |
| 2,749,184 | Wood | June 5, 1956 |
| 2,749,185 | Wood | June 5, 1956 |
| 2,819,119 | Perrin | Jan. 7, 1958 |

FOREIGN PATENTS

| | | |
|---|---|---|
| 717,798 | Germany | Feb. 23, 1942 |
| 1,061,278 | France | Nov. 25, 1953 |